(12) United States Patent
Persson et al.

(10) Patent No.: US 9,736,809 B2
(45) Date of Patent: Aug. 15, 2017

(54) METHOD FOR IMPROVED INDOOR POSITIONING AND CROWD SOURCING USING PDR

(71) Applicant: Sony Corporation, Tokyo (JP)

(72) Inventors: Magnus Persson, Lund (SE); Martin Karlsson, Lund (SE); Fredrik Karlsson, Lund (SE)

(73) Assignees: Sony Corporation, Tokyo (JP); Sony Mobile Communications Inc., Tokyo (JP)

(*) Notice: Subject to any disclaimer, the term of this patent is extended or adjusted under 35 U.S.C. 154(b) by 171 days.

(21) Appl. No.: 14/409,044

(22) PCT Filed: Feb. 5, 2014

(86) PCT No.: PCT/IB2014/000123
§ 371 (c)(1),
(2) Date: Dec. 18, 2014

(87) PCT Pub. No.: WO2015/118369
PCT Pub. Date: Aug. 13, 2015

(65) Prior Publication Data
US 2016/0278039 A1    Sep. 22, 2016

(51) Int. Cl.
*H04W 24/00* (2009.01)
*H04W 64/00* (2009.01)
(Continued)

(52) U.S. Cl.
CPC ............. *H04W 64/006* (2013.01); *G01S 5/02* (2013.01); *G01S 5/0252* (2013.01);
(Continued)

(58) Field of Classification Search
CPC ...... H04W 16/18; H04W 24/08; H04W 48/16
(Continued)

(56) References Cited

U.S. PATENT DOCUMENTS 6,061,021 A   5/2000   Zibell
6,539,229 B1* 3/2003   Ali ..................... G01S 5/0036
                                                342/450
(Continued)

FOREIGN PATENT DOCUMENTS

EP    0800319 A1   10/1997
EP    0838692 A1    4/1998
(Continued)

OTHER PUBLICATIONS

Klingbeil, Lasse et al.: "Multi-modal sensor data and information fusion for localization in indoor environments". Positioning Navigation and Communication (WPNC), 2010 7th Workshop on, IEEE, Piscataway, NJ, USA, Mar. 11, 2010, pp. 187-192, XP031815261.*
(Continued)

*Primary Examiner* — Ronald Eisner
(74) *Attorney, Agent, or Firm* — James C. Edwards; Moore & Van Allen, PLLC

(57) ABSTRACT

The invention is directed to determining a position of a mobile device. An exemplary method comprises scanning a wireless signal associated with the mobile device; measuring a signal strength associated with the wireless signal; determining a timestamp associated with the measurement; and determining a position of the mobile device based on the signal strength measurement and the timestamp. The present invention is useful for both positioning a user of the mobile device and for locating an access point.

15 Claims, 2 Drawing Sheets

(51) Int. Cl.
*G01S 5/02* (2010.01)
*H04B 17/318* (2015.01)
*H04W 84/12* (2009.01)

(52) U.S. Cl.
CPC ........... *G01S 5/0294* (2013.01); *H04W 64/00* (2013.01); *H04B 17/318* (2015.01); *H04W 84/12* (2013.01)

(58) Field of Classification Search
USPC ............... 455/404.1, 404.32, 456.1–457; 340/539.13, 988–996; D10/104.2
See application file for complete search history.

(56) References Cited

U.S. PATENT DOCUMENTS

| | | | |
|---|---|---|---|
| 2011/0060522 A1* | 3/2011 | Oh | G01C 21/12 701/494 |
| 2011/0117924 A1* | 5/2011 | Brunner | G01S 5/0252 455/456.1 |
| 2012/0057536 A1* | 3/2012 | Verma | H04W 72/0453 370/329 |
| 2012/0142366 A1* | 6/2012 | De Castro Riesco | G01S 5/0252 455/456.1 |
| 2012/0184287 A1 | 7/2012 | Jovicic et al. | |

FOREIGN PATENT DOCUMENTS

| | | |
|---|---|---|
| EP | 1906692 A1 | 4/2008 |
| EP | 2360982 A2 | 8/2011 |
| GB | 2497813 A | 6/2013 |
| GB | 2504367 A | 1/2014 |
| WO | 0235766 A2 | 5/2002 |

OTHER PUBLICATIONS

International Search Report and Written Opinion; Dec. 9, 2014; issued in International Patent Application No. PCT/IB2014/000123.
International Preliminary Report on Patentability; Aug. 18, 2016; issued in International Patent Application No. PCT/IB2014/000123.

* cited by examiner

METHOD FOR IMPROVED INDOOR POSITIONING AND CROWD SOURCING USING PDR

BACKGROUND ART

Scanning wireless signals from a mobile device may be used to determine a position of the mobile device. However, a mobile device may change its position from the time of scanning the wireless signals to the time of reporting the scanning of the wireless signals. This may result in an inaccurate determination of the position of the mobile device. Therefore, there is a need to rectify this inaccuracy.

SUMMARY

Embodiments of the invention are directed to a system, method, and computer program product for determining a position of a mobile device. An exemplary method comprises: scanning a wireless signal associated with the mobile device; measuring a signal strength associated with the wireless signal; determining a timestamp associated with the measurement; and determining a position of the mobile device based on the signal strength measurement and the timestamp.

In some embodiments, the method further comprises determining the position of the mobile device based on a pedestrian dead reckoning (PDR) measurement.

In some embodiments, the method further comprises mapping the scanned wireless signal to the position of the mobile device at the time of scanning the wireless signal.

In some embodiments, there is a delay between the scanning of the wireless signal and reporting of a result of the scanning of the wireless signal.

In some embodiments, the wireless signal comprises at least one wireless fidelity (WiFi) signal.

In some embodiments, the at least one WiFi signal comprises a 5 GHz signal and a 2.4 GHz signal.

In some embodiments, the method further comprises determining a modeled signal strength for the signal strength measurement based on the determined position.

In some embodiments, the method further comprises determining the position based on a particle-filter technique.

In some embodiments, the method further comprises determining the position based on at least one of a least squares technique or a Kalman filter technique.

In some embodiments, the method further comprises locating an access point based on the signal strength measurement and the determined position.

In some embodiments, the wireless signal comprises a radio signal associated with at least one of Bluetooth, Bluetooth Low Energy, Zigbee, or a cellular network.

In some embodiments, the method further comprises repeating the scanning, measuring, determining the timestamp, and determining the position steps.

In some embodiments, the method further comprises measuring a time-of-flight associated with the wireless signal, and determining the position further comprises determining the position based on the time-of-flight associated with the wireless signal.

In some embodiments, determining the position further comprises determining the position based on a time difference of arrival technique associated with the wireless signal and a second wireless signal.

In some embodiments, the mobile device comprises at least one of a mobile phone, a mobile computing device, a mobile television, a laptop computer, a smart screen, a tablet computer, a portable desktop computer, an e-reader, a scanner, a portable media device, eyewear, a gaming device, eyeglasses, headgear, a camera, a watch, or a band or other wearable device.

In some embodiments, a system is provided for determining a position of a mobile device. The system comprises: a memory; a processor; and a module, stored in the memory, executable by the processor, and configured to: scan a wireless signal associated with the mobile device; measure a signal strength associated with the wireless signal; determine a timestamp associated with the measurement; and determine a position of the mobile device based on the signal strength measurement and the timestamp.

In some embodiments, a computer program product for determining a position of a mobile device. The computer program product comprises a non-transitory computer-readable medium comprising code configured to: scan a wireless signal associated with the mobile device; measure a signal strength associated with the wireless signal; determine a timestamp associated with the measurement; and determine a position of the mobile device based on the signal strength measurement and the timestamp.

BRIEF DESCRIPTION OF DRAWINGS

Figure 1A:
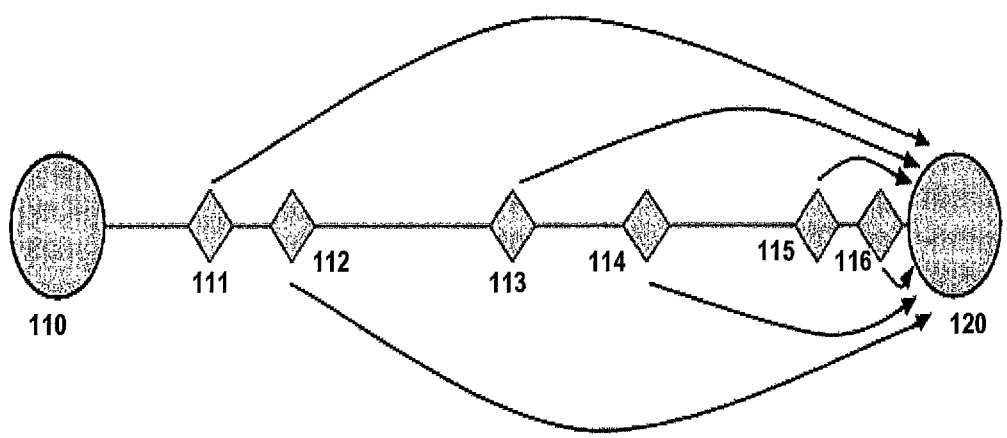
Figure 1B:
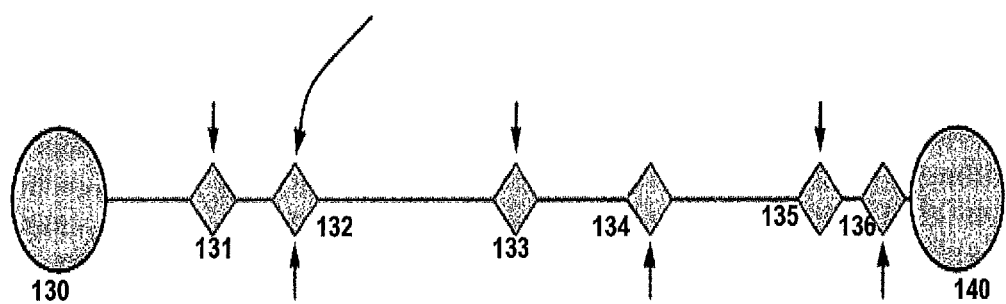
Figure 2:
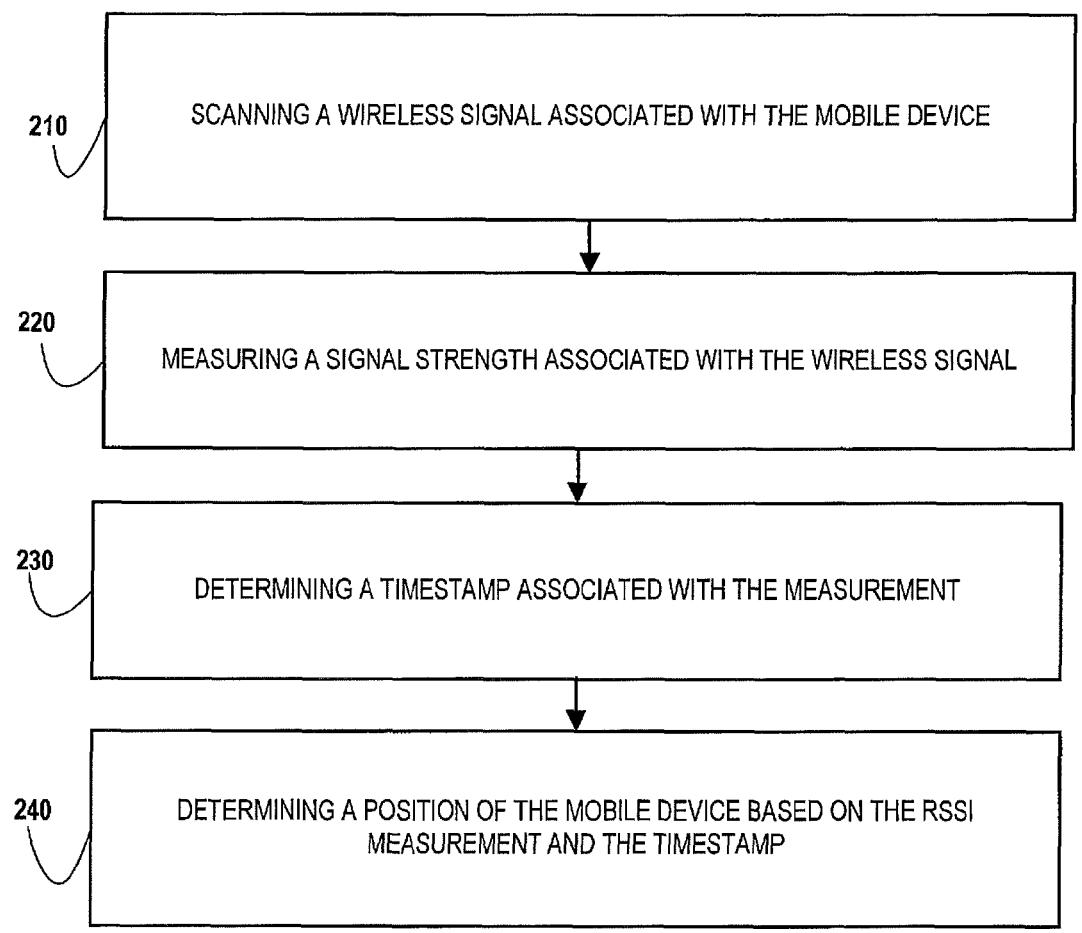

Having thus described embodiments of the invention in general terms, reference will now be made to the accompanying drawings, where:

FIGS. 1A and 1B present exemplary block diagrams for determining a position of a mobile device, in accordance with embodiments of the present invention; and FIG. 2 presents an exemplary process flow for determining a position of a mobile device, in accordance with embodiments of the present invention.

DESCRIPTION OF EMBODIMENTS

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

The present invention is directed to using a timestamp for a signal strength measurement in order to determine a position of a mobile device. Using a mobile device, signal strength measurements and pedestrian dead reckoning (PDR) measurements or techniques can be combined to estimate the position of the mobile device or of a user associated with the mobile device. These measurements can also be used for crowd sourcing in order to localize wireless fidelity (WiFi) access points with unknown positions. One issue that arises with these measurements is that if both 2.4 GHz and 5 GHz WiFi signals need to be measured, it takes approximately four (4) seconds to scan both the 2.4 GHz and 5 GHz WiFi signals. Once the 2.4 GHz and 5 GHz WiFi signal measurements are taken, they can be used for estimating or reporting the position of a mobile device or for estimating or reporting the distance from a mobile device to a WiFi access point. Therefore, values that are at least four (4) seconds old are used to make the estimations or reports. If the user is walking at a normal pace, four (4) seconds corresponds to a distance of approximately 5.6 m. In common practice, the values are treated as if they were measured at the same time they are reported, which is relatively inaccurate. This lowers the accuracy of positioning of the user and localizing an access point.

As used herein, PDR is used to estimate how a user (or device associated with the user) is moving. PDR uses inertial sensors such as an accelerometer and a gyroscope. The accelerometer is used for detecting when the user takes a step, and the gyroscope (potentially combined with a magnetometer) is used to keep track on the direction of the user's step.

The present invention is directed to using a timestamp for each signal strength measurement. This enables consideration of the user's movement from the time of signal strength measurement to the time of reporting the signal strength measurement. Based on the timestamp associated with the signal strength measurement, the present invention uses PDR to reconstruct how the mobile device moved during the scanning of the 2.4 GHz and 5 GHz WiFi signals. Once the reconstruction has been accomplished, each signal strength measurement is mapped to at least one hypothesized position of the mobile device.

Referring now to FIG. 1A, FIG. 1A illustrates a method for determining a position of a mobile device. FIG. 1A illustrates a first position 110 (start of scan), a second position 120 (where scan results are reported), and several intermediate steps 111, 112, 113, 114, 115, and 116. The mobile device is scanned at intermediate steps 111, 112, 113, 114, 115, and 116; however, the scans associated with these intermediate steps are not reported until the second position 120. As illustrated in FIG. 1A, the position (e.g., the second position 120) of the mobile device is determined based on the scan results. As described previously, the determined position is inaccurate because the scanned results are not reported until the mobile device reaches the second position 120.

Referring now to FIG. 1B, FIG. 1B illustrates a method for determining a position of a mobile device, in accordance with embodiments of the invention. FIG. 1B illustrates a first position 130 (start of scan), a second position 140 (where scan results are reported), and several intermediate steps 131, 132, 133, 134, 135, and 136. The mobile device is scanned at intermediate steps 131, 132, 133, 134, 135, and 136, and timestamps associated with these scans are stored in the mobile device. As illustrated in FIG. 1B, the position (e.g., the second position 140) of the mobile device is determined based on the scans, and based on timestamps associated with the scans at intermediate steps 131, 132, 133, 134, 135, and 136. As described herein, PDR techniques are used with the timestamp data to determine the position (e.g., the second position 140) of the mobile device.

Referring now to the process flow of FIG. 2, FIG. 2 presents a process flow for determining a position of a mobile device. At block 210, the process flow comprises scanning a wireless signal (e.g., WiFi signals such as 5 GHz and 2.4 GHz signals) associated with the mobile device. At block 220, the process flow comprises measuring a signal strength associated with the wireless signal. Signal strength may be measured in dBm. In some embodiments, the signal strength comprises a relative signal strength index (RSSI). At block 230, the process flow comprises determining a timestamp associated with the measurement. At block 240, the process flow comprises determining a position of the mobile device based on the signal strength measurement and the timestamp. The present invention enables determination of the position either in an enclosed or indoor environment or in an outdoor environment. In some embodiments, the process flow further comprises repeating the scanning, measuring, determining the timestamp, and determining the position steps.

In some embodiments, in addition to or instead of the signal strength, the present invention determines the position of the mobile device based on a round trip time (RTT), time-of-flight, or time difference of arrival (TDOA) associated with the wireless signal. The RTT or time-of-flight associated with the wireless signal refers to the duration of time for a signal to travel from a source, scan the mobile device (e.g., a channel associated with the mobile device), and then travel back to the source. The TDOA refers to the time difference between a first wireless signal departing the mobile device and arriving at a first receiver (e.g., a first base station) with a known first location, and a second wireless signal departing the mobile device and arriving at a second receiver (e.g., a second base station) with a known second location.

The present invention estimates the position of the mobile device based on a PDR technique, wherein the estimation is completed before determining the position of the mobile device based on the signal strength measurement and the timestamp. The present invention models a signal strength at the estimated position, and compares the signal strength measurement with the modeled signal strength in order to map the scanned wireless signal to the position of the mobile device at the time of scanning the wireless signal. Therefore, the present invention reduces any discrepancy associated with the delay between the scanning of the wireless signal and reporting of a result of the scanning of the wireless signal.

The present invention can be used for positioning a mobile device (or a user of the mobile device). For example, the present invention determines the position based on a particle-filter technique. In a particle filter, each particle represents a hypothesized position. During a scan, the particle moves according a PDR estimation. When the result of a scan is obtained, the modeled signal strength is calculated. The modeled signal strength is dependent on the particle's distance to an access point, and hence is dependent on the hypothesized position of the particle. The particle's position is estimated based on comparing the signal strength measurement to the modeled signal strength. In alternate embodiments, the present invention determines the position based on at least one of a least squares technique or a Kalman filter technique.

In some embodiments, the present invention locates an access point based on the signal strength measurement (step 220) and the determined position (step 240). In some embodiments, the wireless signal comprises a radio signal associated with at least one of Bluetooth, Bluetooth Low Energy, Zigbee, or a cellular network.

As a summary, using measurements including but not limited to signal strength and/or time from transmitters with known locations and a filtering technique including but not limited to a particle filter, Kalman filter, least squares method or trilateration method, a position estimate (e.g., of a mobile device) can be obtained. This is done by either using a model of the received signal power attenuation with distance, a received time, or any other method of estimating the distance to the transmitters and applying one or several position estimation techniques mentioned above to this data. The position estimation can be improved by using several types of measurements or by adding data from sensors contained in or on the mobile device, including, but not limited to, accelerometers, gyroscopes, magnetometers, and barometric pressure sensors. Such sensors can be operably connected to the processor and memory of the mobile device so that data from the sensor can be saved and transmitted by the mobile device. The sensor data can be used to construct a pedestrian dead reckoning (PDR) estimation of movement or any other method of estimating positions from sensor data.

The invention is not limited to any particular types of mobile devices. As used herein, a mobile device may also be referred to as a device or a system. Examples of mobile devices include mobile phones or other mobile computing devices, mobile televisions, laptop computers, smart screens, tablet computers or tablets, portable desktop computers, e-readers, eyeglasses, headgear, eyewear, scanners, portable media devices, gaming devices, cameras or other image-capturing devices, watches, bands (e.g., wristbands) or other wearable devices, or other portable or non-portable computing or non-computing devices.

Each mobile device or system described herein is a computing device that comprises a processor, a memory, and a module stored in the memory, executable by the processor, and configured to perform the various processes described herein. Each processor described herein generally includes circuitry for implementing audio, visual, and/or logic functions. For example, the processor may include a digital signal processor device, a microprocessor device, and various analog-to-digital converters, digital-to-analog converters, and other support circuits. The processor may also include functionality to operate one or more software programs based at least partially on computer-executable program code portions thereof, which may be stored, for example, in a memory.

Each memory may include any computer-readable medium. For example, memory may include volatile memory, such as volatile random access memory (RAM) having a cache area for the temporary storage of information. Memory may also include nonvolatile memory, which may be embedded and/or may be removable. The nonvolatile memory may additionally or alternatively include an EEPROM, flash memory, and/or the like. The memory may store any one or more of pieces of information and data used by the system in which it resides to implement the functions of that system.

In accordance with embodiments of the invention, the term "module" with respect to a system (or a device) may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized.

The computer-readable medium may include, but is not limited to, a non-transitory computer-readable medium, such as a tangible electronic, magnetic, optical, electro-magnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

The invention claimed is:

1. A method for determining a position of a mobile device, the method comprising:
   scanning a wireless signal associated with the mobile device;
   measuring a signal strength associated with the wireless signal;
   determining a timestamp associated with the measurement;
   estimating a position of the mobile device based on a pedestrian dead reckoning (PDR) technique; and
   determining an actual position of the mobile device by modeling a signal strength at the estimated position and comparing the signal strength measurement with the modeled signal strength to map the scanned wireless signal to a position of the mobile device at a time associated with the timestamp.

2. The method of claim 1, wherein there is a delay between the scanning of the wireless signal and reporting of a result of the scanning of the wireless signal.

3. The method of claim 1, wherein the wireless signal comprises at least one wireless fidelity (WiFi) signal.

4. The method of claim 3, wherein the at least one wireless fidelity WiFi signal comprises a 5 GHz signal and a 2.4 GHz signal.

5. The method of claim 1, further comprising determining a modeled signal strength for the signal strength measurement based on the determined position.

6. The method of claim 1, further comprising determining the position based on a particle-filter technique.

7. The method of claim 1, further comprising determining the position based on at least one of a least squares technique or a Kalman filter technique.

8. The method claim 1, further comprising locating an access point based on the signal strength measurement and the determined position.

9. The method of claim 1, wherein the wireless signal comprises a radio signal associated with at least one of Bluetooth, Bluetooth Low Energy, Zigbee, or a cellular network.

10. The method of claim 1, further comprising repeating the scanning, measuring, determining the timestamp, and determining the position steps.

11. The method of claim 1, further comprising:
    measuring a time-of-flight associated with the wireless signal; and wherein determining the position further comprises determining the position based on the time-of-flight associated with the wireless signal.

12. The method of claim 1, wherein determining the position further comprises determining the position based on a time difference of arrival technique associated with the wireless signal and a second wireless signal.

13. The method of claim 1, wherein the mobile device comprises at least one of a mobile phone, a mobile computing device, a mobile television, a laptop computer, a smart screen, a tablet computer, a portable desktop computer, an e-reader, a scanner, a portable media device, eyewear, a gaming device, eyeglasses, headgear, a camera, a watch, or a band or other wearable device.

14. A system for determining a position of a mobile device, the system comprising:
    a memory;
    a processor; and
    a module, stored in the memory, executable by the processor, and configured to:
       scan a wireless signal associated with the mobile device,
       measure a signal strength associated with the wireless signal,
       determine a timestamp associated with the measurement,
       estimate a position of the mobile device based on a pedestrian dead reckoning (PDR) technique, and
       determine an actual position of the mobile device by modeling a signal strength at the estimated position and comparing the signal strength measurement with the modeled signal strength to map the scanned wireless signal to a position of the mobile device at a time associated with the timestamp.

15. A non-transitory computer program product for determining a position of a mobile device, the non-transitory computer program product comprising a non-transitory computer-readable medium comprising code configured to:
    scan a wireless signal associated with the mobile device;

measure a signal strength associated with the wireless signal;
determine a timestamp associated with the measurement;
estimate a position of the mobile device based on a pedestrian dead reckoning (PDR) technique; and
determine an actual position of the mobile device by modeling a signal strength at the estimated position and comparing the signal strength measurement with the modeled signal strength to map the scanned wireless signal to a position of the mobile device at a time associated with the timestamp.

* * * * *